May 3, 1960  P. C. CHRISTENSON  2,935,594
BURNING-IN OVEN
Filed Aug. 26, 1958  4 Sheets-Sheet 1
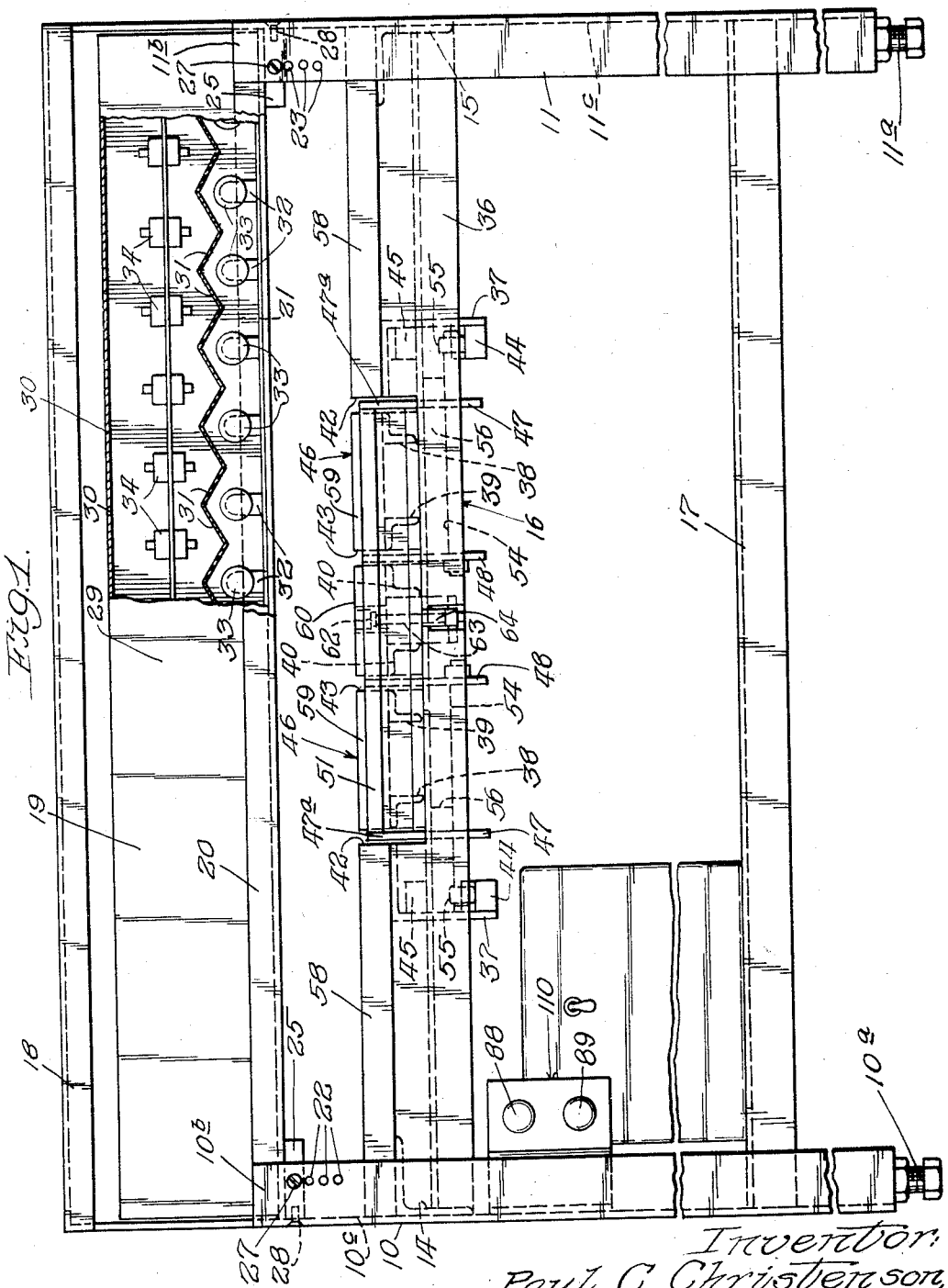
Inventor:
Paul C. Christenson,
By Schraeder, Hofgren,
Brady & Wegner, Attys.

May 3, 1960 P. C. CHRISTENSON 2,935,594
BURNING-IN OVEN
Filed Aug. 26, 1958 4 Sheets-Sheet 2
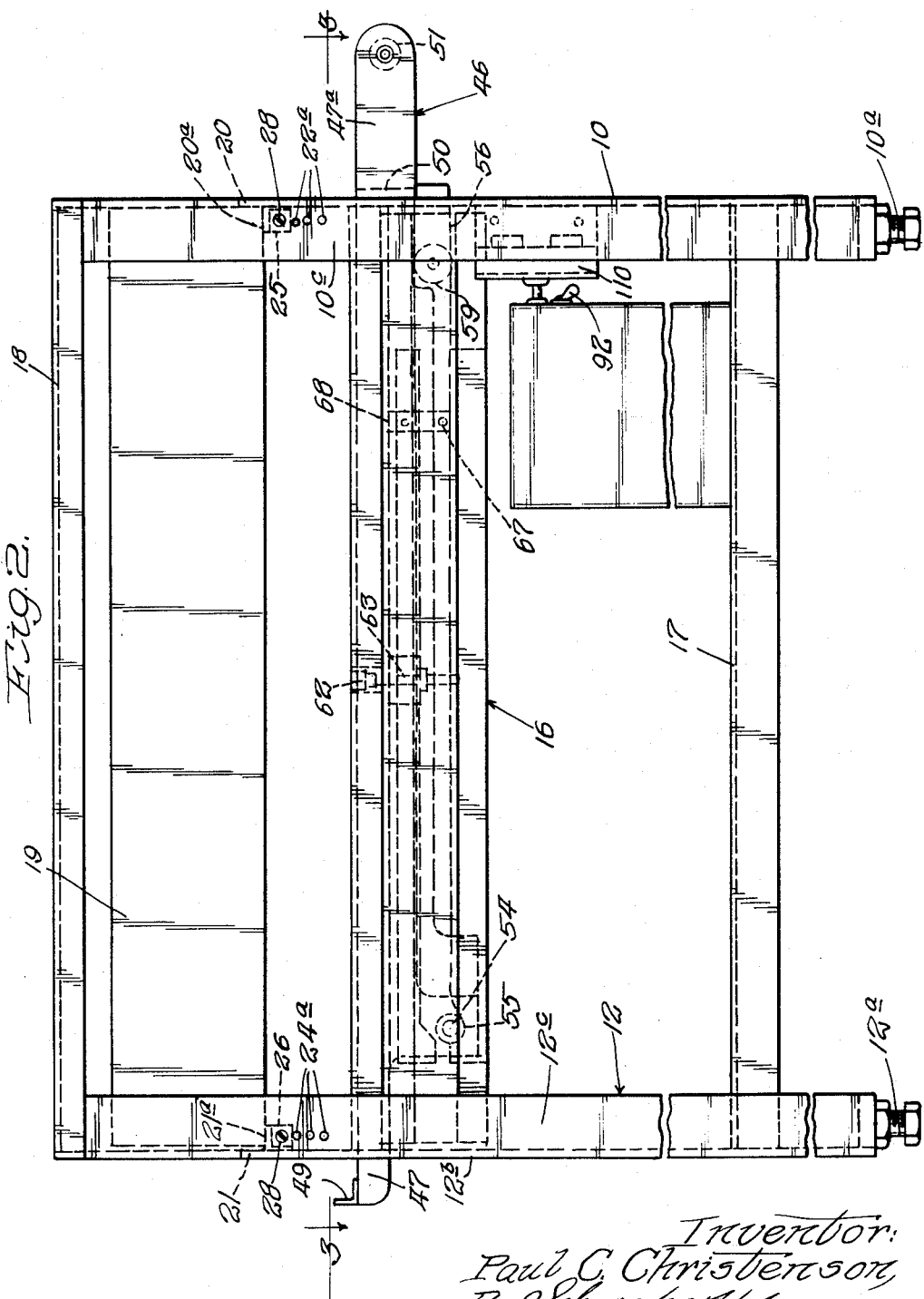
Inventor:
Paul C. Christenson,
By Schroeder, Hofgren,
Brady & Wegner, Attys.

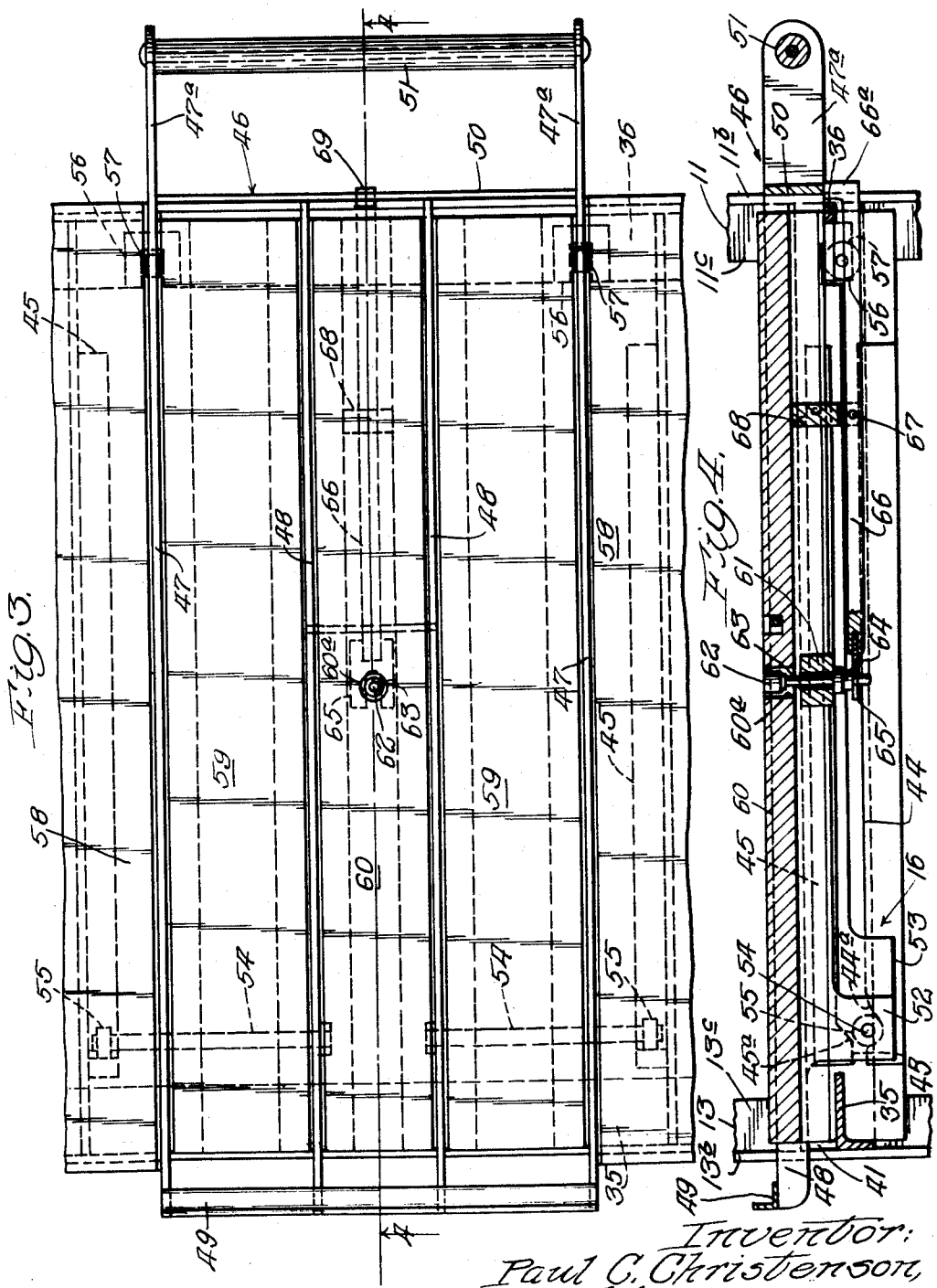

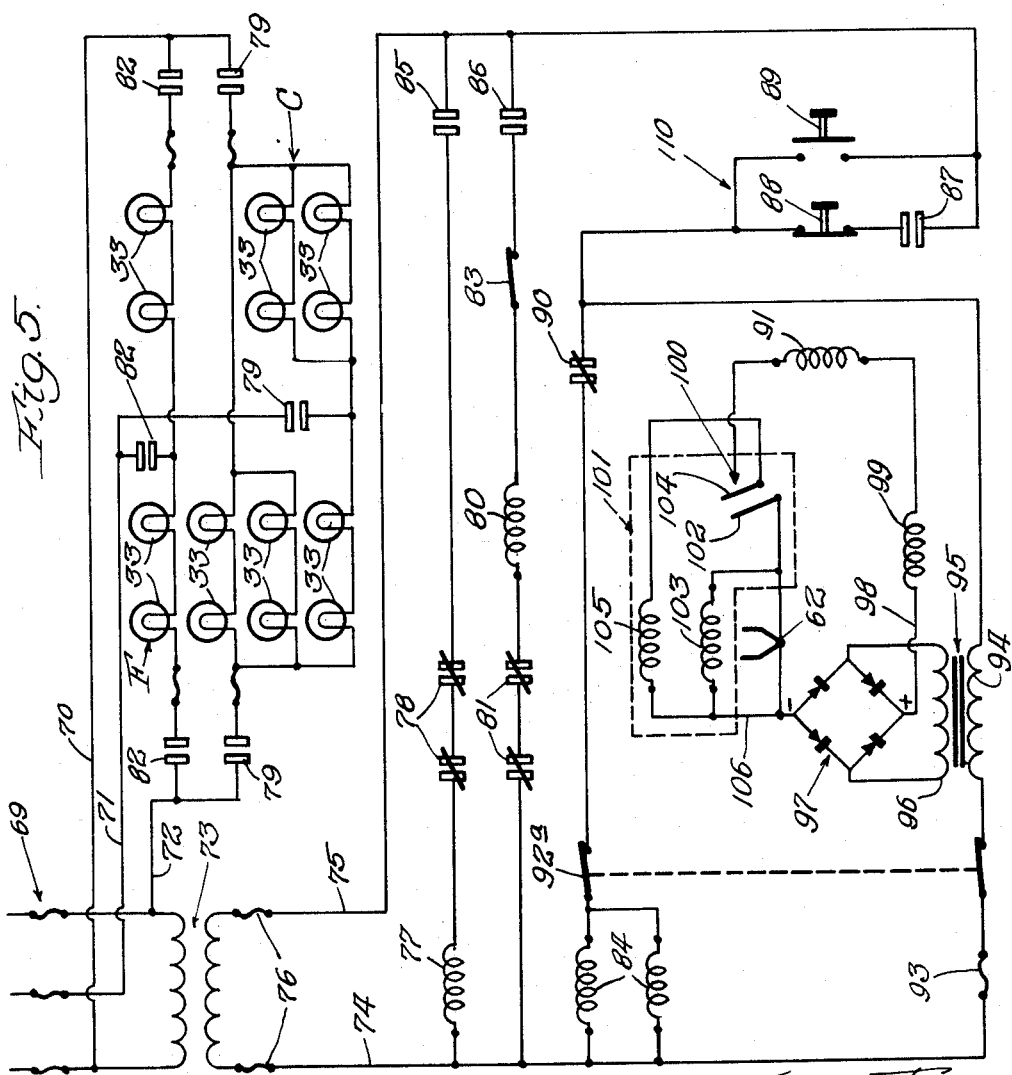

United States Patent Office 2,935,594
Patented May 3, 1960

2,935,594

BURNING-IN OVEN

Paul C. Christenson, Homewood, Ill., assignor to R. R. Donnelley & Sons Company, a corporation of Delaware Application August 26, 1958, Serial No. 757,239

16 Claims. (Cl. 219—35)

This invention relates to an oven for heat conditioning etching resist on engraving plates.

Engraving plates for halftone or line printing must be provided with a coating which is resistant to the etching fluid; and most resists commonly used require a heat conditioning step, known in the art as burning-in, before the plate is etched.

Etching resists of the highest quality must be burned in under carefully controlled conditions; and many different types of devices have been developed in an effort to obtain highly accurate control of the surface temperature of the plate upon which the resist is burned in. Some burning-in ovens attempt to achieve temperature control by the air temperature in the oven; while others employ a timer. Such means do not provide the accurate control of plate temperature which is needed for the best results.

In accordance with the present invention, a burning-in oven has a contact thermocouple which is mounted in the oven floor and urged upwardly against the underside of a plate in the oven. A radiant heat source in the form of a battery of quartz tubes in the upper part of the oven is controlled by the thermocouple; and the oven floor surrounding the thermocouple and the plate is heavily heat insulated so that the thermocouple receives substantially all of its heat by conduction through the plate on which the resist is being burned in. The thermocouple control circuit is of a type which breaks the circuit to the radiant heat source when the thermocouple reaches a predetermined temperature; and since the thermocouple receives its heat directly from the plate bearing the resist, the control arrangement provides an extremely accurate means for assuring that the resist is heated to the proper temperature.

The invention is illustrated in a preferred embodiment in the accompanying drawings, in which Fig. 1 is a fragmentary front elevational view of the burning-in oven with parts broken away for clarity of illustration;

Fig. 2 is a side elevation viewing Fig. 1 from the left;

Fig. 3 is a horizontal sectional view taken substantially as illustrated along the line 3—3 of Fig. 2;

Fig. 4 is a longitudinal sectional view taken substantially as illustrated along the line 4—4 of Fig. 3 and Fig. 5 is a wiring diagram of the control circuit for the radiant heat lamps.

Referring to the drawings in greater detail, and referring first to Figs. 1 and 2, the burning-in oven has a base frame including corner posts 10, 11, 12 and 13, there being longitudinal angle members 14 and 15 connecting corner posts 10 and 12, and 11 and 13, respectively, which are the side members of an intermediate deck assembly indicated generally at 16; and a bottom platform 17 which is secured to all four of the corner posts. The corner posts are upright angle members which extend upward to support a top deck structure 18 which is spaced a substantial distance above the intermediate deck 16; and the transversely extending legs 10b and 11b of posts 10 and 11 are cut off below top deck 18 as seen in Fig. 1, so that a lamp housing 19 may be inserted into the frame work from the front and supported on adjustable angle bars 20 and 21 at the front and rear of the frame. As best seen in Fig. 2, adjustment bars 20 and 21 are secured to the corner posts with their horizontal legs 20a and 21a, respectively, extending inwardly to provide supports for lamp housing 19.

Transverse legs 10b and 11b, and 12b and 13b of the angle bars forming the corner posts are provided with sets of coplanar, vertically spaced holes such as the holes 22 in the post 10, and 23 in the post 11; and the longitudinally extending legs 10c, 11c, 12c and 13c contain coplanar holes such as the holes 22a and 24a, seen in posts 10 and 12 in Fig. 2. Adjustment bars 20 and 21 are seen in Figs. 1 and 2 to have depending attaching angles 25 and 26, respectively, which fit into the corners of the posts and have holes adapted to register with the sets of holes in said corner posts so that each adjustment bar may be secured at each end by two screws such as the screws 27 and 28 in Figs. 1 and 2.

This permits the spacing between intermediate deck 16 and lamp housing 19 to be varied to suit different conditions.

As best seen in Fig. 1, lamp housing 19 is the form of a rectangular box with sheet metal side walls 29 and top 30; and a transversely extending zig-zag metal reflector 31. Mounted on the walls at the front and rear of lamp housing 19 are sockets 32 for radiant heat tubes 33, and above the reflector 31 are ballasts 34 for said tubes. In the specific embodiment illustrated there are 14 radiant heat tubes 33, as seen in the wiring diagram Fig. 5; and these tubes are divided into a central group C of ten lamps and a flanking group F consisting of two lamps on each side of the central group. Many plates are narrow enough to require only ten lamps; and as described hereinafter the lamps circuit is set up so as to permit the use of either the central group of lamps or all the lamps, at the will of the operator. In either event the lamps provide heat substantially evenly to the entire surface of the plate.

As best seen in Figs. 1, 3 and 4, intermediate deck 16, in addition to longitudinal angle members 14 and 15, includes a rear angle member 35 and a front angle member 36 between which are extended a pair of longitudinal outer angle members 37, and three pairs of internal angle members numbered 38, 39 and 40, respectively. Surmounting rear angle member 35 is a back plate 41 which is secured at its ends to the corner posts 12 and 13, and which is provided with upright slots 42 aligned with the space between angle members 37 and 38, and with upright slots 43 aligned with the space between angle members 39 and 40.

Referring now particularly to Figs. 2 and 4, outer angle members 37 support carrier rails 44 and spaced above the carrier rails are guide rails 45 which cooperate with the carrier rails to support and guide a plate carriage, indicated generally at 46. As best seen in Figs. 3 and 4, carriage 46 includes a pair of longitudinal outer frame bars 47 aligned with slots 42 in back plate 41, and a pair of inner frame bars 48 aligned with slots 43 in back plate 42, and all of the carriage frame bars are connected to a rear angle 49 and a front rail 50 to provide a rectangular frame from which the side rails 47 project forwardly as seen at 47a in Fig. 3 to support a handle 51. The longitudinal frame bars 47 and 48 of carriage 46 have at their rear ends downwardly extending axle supporting bosses, numbered 52 and 53, respectively; and in said bosses are supported axles 54 which extend laterally outside the outer bars 47 to carry outrigged rollers 55 which ride on carrier rails 44 and are guided beneath guide rails 45. As seen in Figs. 2, 3 and 4, a pair of roller brackets 56 is secured to front angle 36 of intermediate deck 16 to receive rollers 57 upon which outer longitudinal frame members 47 of the plate carriage rest. As best seen in Fig. 4, at the rear of carrier rails 44 are recesses 44a in which rollers 55 seat when the plate carriage 46 is positioned fully within the oven, and side frame members 47 of the carriage are notched near their forward ends, as seen at 47b, so that the forward end of the carriage must be lifted to carry it over support rollers 57 before it may be moved out of the oven on tracks 44. Likewise, guide rails 45 have depending stop portions 45a at their rear ends to prevent carriage rollers 55 from being accidentally pushed off the rear of tracks 44.

As best seen in Figs. 1 and 3, intermediate deck 16 alongside carriage 46 is covered by a pair of rectangular insulating panels 58 which prevent the heat generated by lamps 33 from passing to the lower portion of the oven structure; and similarly the entire upper surface of carriage 46 is provided with insulating panels 59 at its two sides and 60 in its central area, so that a plate on the carriage is supported solely on heat insulating means to prevent any irregularity in the heating of the plate.

As seen in Figs. 3 and 4, insulating pad 60 is provided with a central opening 60a beneath which is a sleeve 61; and a thermocouple element 62 is positioned in opening 60a and has a stem 63 extending downwardly through sleeve 61, there being a shouldered fitting 64 on stem 63 so that the assembly including thermocouple element 62 may rest upon a bifurcated support 65 of a lever 66 with the top of element 62 flush with the top of pad 60. As best seen in Figs. 3 and 4, lever 66 is pivoted on a pin 67 in a bracket 68 which is mounted on intermediate deck 16, and lever 66 has an upturned outer end 66a upon which cross rail 50 of carriage 46 rests when the carriage is fully within the oven. The lever arrangement permits thermocouple element 62 to be retracted from opening 60a in insulating pad 60 when carriage 46 is to be withdrawn from the oven. Lifting the forward end of the carriage to clear the supporting rollers 57 takes the weight off the upward extension 66a of lever 66, permitting the opposite end of the lever to drop so that thermocouple element 62 moves down far enough to clear the bottom of insulating panel 60. Thus, the positioning of thermocouple contact 62 flush with the top of insulating panel 60 does not interfere with the free withdrawal of carriage 46 from the oven, and when the carriage is returned to its position in the oven as seen in Fig. 4 the pressure of front rail 50 of the carriage on upper extension 66a of the lever automatically raises thermocouple element 62 to its operative position in which its top face is flush with the upper surface of insulating panel 60.

It is apparent from the foregoing detailed description of the mechanical components of the oven assembly that a plate which is to have resist burned in on a surface may be placed upon the insulating panels 59 and 60 of plate carriage 46 when the carriage is in a loading position projecting forwardly from the oven frame, and when the carriage is pushed to its inward position as seen in Figs. 2 and 4 the thermocouple contact 62 is automatically moved upwardly into direct contact with the underside of a plate supported upon the carriage. A resist coated plate may be placed in the oven with the resist either up or down, so the "underside" may be the face or the back of the plate.

The control circuit for the heat lamps 33 is illustrated in Fig. 5. As previously stated, power to heat lamps 33 is controlled by thermocouple 62 to de-energize the lamps when the plate reaches a desired temperature. A three-phase fused power supply 69 is connected through leads 70, 71 and 72 to control transformer 73 to provide control current through a pair of leads 74 and 75 having fuses 76. The energization of the central group C and flanking group F of lamps 33 is controlled by a pair of starters through which each group is connected to leads 70, 71 and 72. The C group operates through a starter comprising a coil 77; series connected, normally closed overload contacts 78; and three pairs of normally open load contacts 79; while the F group operates through a starter comprising a coil 80, series connected, normally closed overload contacts 81; and three pairs of normally open load contacts 82. A manual toggle switch 83 is connected in series with coil 80 to permit flanking group F of lamps 33 to be cut out of the circuit if the plate to be baked is small enough that ten lamps is enough.

Automatic control of coils 77 and 80 is effected by relay means comprising a pair of coils 84, a first set of normally open contacts 85 connected in series with starter coil 77, a second set of normally open contacts 86 connected in series with starter coil 80, and a third set of normally open contacts 87 connected in series from line 75 with a standard start-stop push button unit 110 including a normally closed "Stop" push button switch 88 and a normally open "Start" push button switch 89 connected across push button unit 88 and contacts 87 to line 75. In series between the parallel push button unit 110 and relay coils 84 is a normally closed contact 90 of a relay 91, and one section 92a of a double pole, single throw manually operable "On-Off" toggle switch 92, the other section 92b of which is connected in series with a fuse 93 to control lead 74 and through primary winding 94 of a transformer 95 to the line between contact 90 and push button unit 110. The secondary winding 96 of transformer 95 is connected across a bridge rectifier 97. Switch 92 is solely for the convenience of maintenance personnel working on the control circuit, and provides a single switch which assures that the entire control circuit is de-energized when work is done on it. It is ordinarily kept closed, as shown in Fig. 5.

One side of coil 91 is connected to the positive output 98 of rectifier 97 through a resistor 99 and the opposite side of coil 91 is connected to a contact 100 in an indicator 101 having an indicator arm 102 which is moved by a coil 103 connected across thermocouple contact 62. When a plate in contact with thermocouple element 62 reaches the desired temperature, arm 102 is juxtaposed to contact 100. However, another contact 104 is interposed between arm 102 and contact 100 whereby, at this time, contact 100, arm 102, and contact 104 are electrically connected. This connects a locking coil 105 of indicator 101 to contact 100 from the negative output 106 of rectifier 97 which automatically locks arm 102 in the position in which it is juxtaposed to contact 100, and establishing a series circuit through coil 91. Since plates of different types and resists of different kinds require different burning-in conditions of temperature and time contact 100 is manually movable to change the temperature at which the circuits are closed by movement of arm 102.

The normal operation of the above described control is as follows. "On-Off" switch sections 92a and 92b are closed, as previously stated. "Start" push button switch 89 is depressed to energize coils 84 and thus close contacts 85 and 86, at the same time closing hold circuit contacts 87 to maintain the circuit to coils 84 after push button switch 89 is released. Assuming that manual switch 83 is closed, starter coils 77 and 80 are energized thereby closing their contacts 79 and 82 and connecting all lamps 33 across the power supply 69. If only the central bank C of lamps is to be used, toggle switch 83 is first opened to cut the lamp of bank F out of the circuit.

As the temperature rises in a plate on carriage 46, indicator arm 102 is moved toward contact 100 by the operation of thermocouple 62 and coil 103. At the desired temperature, arm 102 closes with contacts 100 and 104 to energize coil 91, opening contacts 90 and breaking the circuit to coils 84. The de-energization of coils 84 permits contacts 85 and 86 to open thereby dropping out starter coils 77 and 80 and de-energizing the lamps 33. When coils 84 are de-energized it opens contacts 87 to break the holding circuit to coils 84, cutting off the power to the lamps 33.

The foregoing detailed description is given for clearness of understanding only and no unnecessary limitations are to be understood therefrom, as some modifications will be obvious to those skilled in the art.

I claim:

1. In a device of the character described: a chamber; an electric heat source in the top of said chamber; support means in the chamber beneath said heat source to receive a plate to be heated; supporting surfaces of heat insulating material on said support means to make supporting contact with a plate; a circuit to supply electric power to said heat source; and control means in said circuit including a thermal-sensitive element in direct contact with the underside of a plate in the chamber to open said circuit when said element reaches a predetermined temperature.

2. The device of claim 1 in which the heat source includes two groups of heating elements, the circuit includes parallel branch circuits to supply electric power to said two groups, and manual switch means for independently opening one of said branch circuits, whereby said chamber may be heated selectively by one, or both groups of heating elements.

3. The device of claim 1 in which the circuit includes means for selecting within a predetermined range the temperature at which the control means opens the circuit.

4. The device of claim 1 in which the thermal sensitive element is a thermocouple, and the circuit includes an adjustable contact meter relay for selecting within a predetermined range the temperature at which the thermocouple opens said circuit.

5. In a device of the character described: a chamber; an electric heat source in the top of said chamber; horizontal panel means of heat insulating material upon which a plate may be supported in spaced relationship to said heat source, said panel means having a vertical bore; a circuit to supply electric power to said heat source; a thermal-sensitive element in said circuit extending upwardly through said bore to be contacted by a plate on said panel means; and control means in the circuit to open said circuit when said element reaches a predetermined temperature.

6. The device of claim 5 which includes vertically movable support means for said thermal-sensitive element; and means for lowering said element beneath the surface of said panel means.

7. The device of claim 6 which includes a pivot, a lever on said pivot on which said support means is mounted, and means for rocking said lever on the pivot to move the thermal-sensitive element up and down in the bore.

8. In a device of the character described: a chamber; an electric heat source in the top of said chamber; support means in the chamber beneath said heat source to receive a plate to be heated; supporting surfaces of heat insulating material on said support means to make supporting contact with a plate; a circuit to supply electric power to said heat source; a thermal-sensitive element in said circuit in direct contact with the underside of a plate in the chamber; and relay means in said circuit to open the circuit when said element reaches a predetermined temperature.

9. In a device of the character described: a chamber which has a transverse opening in the front; an electric heat source in said chamber above the plane of said opening; a tray mounted in said opening for horizontal movement in and out of the chamber; heat insulating support means on said tray for supporting a plate to be heated; a circuit to supply electric power to said heat source; and control means in said circuit including a thermal-sensitive element in direct contact with the underside of a plate in the chamber to open said circuit when said element reaches a predetermined temperature.

10. The device of claim 9 which includes mounting means supporting the thermal-sensitive element for vertical movement, and lever means operable to move said thermal element down below the tray in conjunction with initial movement of the tray for travel out of the chamber.

11. The device of claim 10 which includes tracks on which the tray is mounted for movement, upright stops at the front of the tracks over which the forward part of the tray must be lifted before it may be moved out of the chamber, and in which the lever is pivoted beneath the tray and has a portion in contact with the forward portion of the tray bottom, said lever being arranged to move the thermal element down when the tray is lifted.

12. In a device of the character described: a chamber which has a transverse opening in the front; an electric heat source in said chamber above the plane of said opening; horizontal heat insulating panel means mounted in the plane of said opening, there being a gap in said panel means extending inwardly from the opening; a tray mounted in said gap for horizontal movement in and out of the chamber in a plane below the heat source; heat insulating means in the top of said tray, the top surface of said insulating means being coplanar with the horizontal panel means when the tray is in the chamber, said insulating means having a vertical bore; vertically movable mounting means in said bore; a circuit to supply electric power to said heat source; a thermal-sensitive element in said circuit, said element being carried on said mounting means so as to be contacted by a plate supported on the panel means; means for lowering said mounting means to withdraw the thermal-sensitive element from the bore prior to moving the tray out of the chamber; and control means in said circuit to open said circuit when said element reaches a predetermined temperature.

13. In a device of the character described: a chamber which has a transverse opening in the front; an electric heat source in said chamber above the plane of said opening; a pair of laterally spaced, horizontal heat insulating panels in the plane of said opening; a set of longitudinal tracks in said chamber below the plane of the opening, said tracks having recesses at the rear; a tray having rollers engaging said tracks for rolling the tray in and out of the chamber, said rollers seating in said recesses to lower the rear of the tray when it is fully in the chamber; heat insulating panel means in the top of said tray, the top surface of said panel means being coplanar with the spaced panels when the tray is fully in the chamber, said panel means having a vertical bore; an upstanding stop member behind which the front of the tray seats when it is fully in the chamber; vertically movable mounting means in said bore; a circuit to supply electric power to said heat source; a thermal-sensitive element in said circuit, said element being carried on said mounting means so as to be contacted by a plate supported on the panel means; means for lowering said mounting means to withdraw the thermal-sensitive element from the bore prior to moving the tray out of the chamber; and control means in said circuit to open the circuit when said element reaches a predetermined temperature.

14. The device of claim 13 in which a lever is pivoted in the chamber with its rear end supporting the mounting means and its front end positioned to be lowered by the downward movement of the tray when the latter is fully in the chamber.

15. In a device of the character described: a chamber which has a transverse opening in the front; an electric heat source in said chamber above the plane of the opening; lateral support means in the plane of the opening; a set of longitudinal tracks in said chamber below the plane of the opening, said tracks having recesses at the rear; upstanding stop means at the front of said tracks; a tray having rollers engaging the tracks for movement in and out of the chamber, said rollers seating in said recesses and the front end of the tray overriding the stop means to drop therebehind when the tray is fully in the chamber, so that the tray moves bodily down at the end of its inward movement and the marginal portions of a plate carried on the tray rest on said lateral support means; mounting means beneath the tray; a circuit to supply electric power to said heat source; a thermal-sensitive element in said circuit and carried on said mounting means to extend upwardly into contact with the underside of a plate resting on said lateral support means; means for lowering said mounting means in conjunction with upward movement of the tray as the latter is moved from a position fully in the chamber; and control means in said circuit to open the circuit when said element reaches a predetermined temperature.

16. In a device of the character described: a chamber; an electric heat source in said chamber to provide heat substantially evenly to a substantial area; support means in the chamber in spaced relationship to said heat source to support a plate in said area with a plate surface facing toward the heat source; supporting surfaces of heat insulating material on said support means to make supporting contact with a plate; a circuit to supply electric power to said heat source; and control means in said circuit including a thermal-sensitive element in direct contact with the side of a plate in said chamber which faces away from the heat source, said control means opening said circuit when the thermal-sensitive element reaches a predetermined temperature.

References Cited in the file of this patent

UNITED STATES PATENTS

| | | |
|---|---|---|
| 2,349,300 | Olsen | May 23, 1944 |
| 2,386,426 | Brannon | Oct. 9, 1945 |
| 2,392,635 | Bletz | Jan. 8, 1946 |
| 2,445,443 | Long | July 20, 1948 |